(12) United States Patent
Killat et al.

(10) Patent No.: US 7,956,113 B2
(45) Date of Patent: Jun. 7, 2011

(54) HYDROPHOBICIZING ADDITIVES

(75) Inventors: Stefan Killat, Burghausen (DE); Peter Fritze, Haiming (DE)

(73) Assignee: Wacker Chemie AG, Munich (DE)

( * ) Notice: Subject to any disclaimer, the term of this patent is extended or adjusted under 35 U.S.C. 154(b) by 693 days.

(21) Appl. No.: 11/720,037

(22) PCT Filed: Nov. 24, 2005

(86) PCT No.: PCT/EP2005/012582
§ 371 (c)(1),
(2), (4) Date: May 23, 2007

(87) PCT Pub. No.: WO2006/058655
PCT Pub. Date: Jun. 6, 2008

(65) Prior Publication Data
US 2008/0132624 A1    Jun. 5, 2008

(30) Foreign Application Priority Data

Dec. 1, 2004   (DE) .......................... 10 2004 057 996

(51) Int. Cl.
   *C08K 5/24*   (2006.01)
(52) U.S. Cl. ........ 524/265; 524/224; 524/261; 524/262; 524/263; 524/266; 524/267; 524/268; 524/315; 524/317; 524/318; 524/322; 524/394; 524/487; 524/503; 525/57; 525/58
(58) Field of Classification Search .................. 524/261, 524/262, 265, 266, 267, 268, 322, 394, 487, 524/503, 224, 263, 315, 317, 318; 525/57, 525/58
See application file for complete search history.

(56) References Cited

U.S. PATENT DOCUMENTS

| | | | |
|---|---|---|---|
| 5,147,917 A | 9/1992 | Sugawara et al. | |
| 5,413,655 A | 5/1995 | Nohr et al. | |
| 5,527,430 A | 6/1996 | Gill | |
| 5,578,668 A | 11/1996 | Colombet et al. | |
| 5,641,535 A | 6/1997 | Eck et al. | |
| 5,681,892 A | 10/1997 | Weidner et al. | |
| 5,753,733 A | 5/1998 | Eck et al. | |
| 5,763,508 A * | 6/1998 | Hess et al. ........................ | 524/5 |
| 5,782,972 A | 7/1998 | Abelleira et al. | |
| 5,962,585 A | 10/1999 | Mayer et al. | |
| 6,090,868 A | 7/2000 | Eck et al. | |
| 6,191,235 B1 | 2/2001 | Eck et al. | |
| 6,242,512 B1 * | 6/2001 | Figge et al. ................... | 523/340 |
| 6,429,239 B1 | 8/2002 | Eck et al. | |
| 6,521,695 B1 | 2/2003 | Peruzzotti et al. | |
| 6,706,805 B2 * | 3/2004 | Weitzel ......................... | 524/563 |
| 6,710,113 B2 * | 3/2004 | Weitzel ......................... | 524/458 |
| 6,900,259 B2 | 5/2005 | Klein et al. | |
| 6,916,865 B2 | 7/2005 | Kumagai et al. | |
| 2002/0045692 A1 | 4/2002 | Fiedler et al. | |
| 2003/0153651 A1 | 8/2003 | Bonetto et al. | |
| 2003/0164478 A1 | 9/2003 | Fiedler | |
| 2003/0219613 A1 | 11/2003 | Boylan et al. | |
| 2004/0019141 A1 * | 1/2004 | Bastelberger et al. ......... | 524/261 |
| 2006/0194006 A1 | 8/2006 | Bacher et al. | |
| 2006/0254468 A1 | 11/2006 | Bastelberger et al. | |

FOREIGN PATENT DOCUMENTS

| | | |
|---|---|---|
| CN | 1139944 A | 1/1997 |
| DE | 195 42 443 A1 | 5/1997 |
| DE | 103 23 205 A1 | 12/2004 |
| EP | 0 493 168 A1 | 7/1992 |
| EP | 0 279 373 B1 | 4/1993 |
| EP | 0 508 155 B1 | 1/1994 |
| EP | 0 754 737 A2 | 1/1997 |
| EP | 0 741 759 B1 | 10/1997 |
| EP | 0 741 760 B1 | 11/1997 |
| EP | 1 193 287 A2 | 4/2002 |
| EP | 1 394 193 A1 | 3/2004 |
| TW | 172736 | 11/1991 |
| WO | WO-95/20627 | 8/1995 |
| WO | WO-02/31036 A1 | 4/2002 |
| WO | 2004/007392 A2 | 1/2004 |
| WO | WO-2004/080909 A2 | 9/2004 |
| WO | 2004/098898 A1 | 11/2004 |

OTHER PUBLICATIONS

US 6,900,259 B2 is corresponding to EP 1 394 193 A1.
US 5,578,668 is corresponding to EP 0 493 168 A1.
US 2002/0045692 A1 is corresponding to EP 1 193 287 A2.
US 5,753,733 is corresponding to EP 0 741 759 B1.
US 6,429,239 B1 is corresponding to EP 0 741 760 B1.
US 5,641,535 is corresponding to EP 0 508 155 B1.
US 2006/0254468 A1 is corresponding to DE 103 23 205 A1.
US 6,090,868 is corresponding to DE 195 42 443 A1.
US 5,681,892 is corresponding to EP 0 754 737 A2.
Patbase abstract corresponding to EP 0 279 373 B1.
Noll et al., Chemie und Technologie der Silicone, Verlag Chemie GmbH, Weinheim/Bergstraβe. is corresponding to Chemistry and Technology of Silicones, Academic Press, Inc., copyright 1968. Fox T.G. et al., Bull. Am. Physics Soc, 1956, p. 123, vol. 1, No. 3.
Polymer Handbook, J. Wiley & Sons, 1975, New York, 2nd Edition.
Houben-Weyl, Methoden der organischen Chemie, Makromolekulare Stoffe, Georg Thieme Verlag, 1961, Stuttgart, pp. 192-208, vol. XIV, No. 1.
Houben-Weyl, Methoden der organischen Chemie, Makromolekulare Stoffe, Georg Thieme Verlag, 1987, Stuttgart, vol. E20 is corresponding to Methods in Organic Chemistry.

* cited by examiner

Primary Examiner — David Wu
Assistant Examiner — Marie Reddick
(74) Attorney, Agent, or Firm — Brooks Kushman P.C.

(57) ABSTRACT

Hydrophobicizing additives are water-redispersible powders or aqueous dispersions containing:
   a) water-insoluble, film-forming base polymer(s) based on homopolymers or copolymers of one or more vinyl esters of optionally branched $C_{1-15}$ alkylcarboxylic, (meth)acrylic esters of $C_{1-15}$ alcohols, vinylaromatics, olefins, dienes and vinyl halides,
   b) one or more hydrophobic organosilicon compounds, fatty acids, or derivatives thereof, or hydrocarbon waxes, and
   c) one or more protective colloids,
wherein the proportion of the component b) based on the total weight of the component a) is more than 30% by weight.

15 Claims, No Drawings

HYDROPHOBICIZING ADDITIVES

CROSS-REFERENCE TO RELATED APPLICATION

This application is the U.S. national phase of PCT Appln. No. PCT/EP2005/012582 filed Nov. 24, 2005, which claims priority to German application 10 2004 057 996.2 filed Dec. 1, 2004.

BACKGROUND OF THE INVENTION

1. Field of the Invention

The invention relates to a hydrophobicizing additives, a process for producing them, and to their use.

2. Description of the Related Art

Polymers based on vinyl esters, vinyl chloride, (meth) acrylate monomers, styrene, butadiene and ethylene are used, in particular in the form of their water-redispersible polymer powders, in many applications, for example as coating agents or adhesives for a wide variety of substrates. Redispersion powders are also used as binders in hydraulically setting coatings or adhesives such as mortar for thermal insulation, tile adhesives, and renders or jointing compositions based on cements or plaster of Paris. In the case of lime- or cement-bound building materials such as renders, knifing fillers, jointing compositions and building adhesives, protection against weathering influences, for example, rain or snow, is frequently required. It is therefore necessary to hydrophobicize the building materials.

In the prior art, redispersion powders which are used for improving mechanical strength have been modified by means of small proportions of hydrophobicizing agents. EP 493168 A1 describes hydrophobically modified redispersion powders based on water-insoluble, film-forming polymers which contain from 0.5 to 20% by weight of silicones as hydrophobic component. WO 2004/080909 A2 describes redispersion powders which contain polyalkylalkylsiloxanes having long-chain hydrocarbon radicals in an amount of from 0.1 to 20% by weight, based on the organic polymer fraction, for hydrophobicization. EP 1193287 A2 describes the use of redispersion powder compositions which contain from 0.1 to 30% by weight of carboxylic esters as hydrophobicizing component in addition to a proportion of water-insoluble, film-forming polymers. EP 1394193 A1 describes an analogous redispersion powder comprising carboxylic esters which contain glycerol, diglycerol or triglycerol as an alcohol component. EP 0741759 B1 and EP 0741760 B1 describe dispersion powder compositions based on water-insoluble, film-forming organic polymers with a proportion of silicon compound of from 0.1 to 30% by weight, based on the organic polymer fraction. In all these starting points for a solution to weathering problems, redispersion powders based on film-forming polymers which are used primarily for improving the mechanical strength of building material compositions are admixed with a small proportion of hydrophobicizing agent. The ratio of silicon compound to film-forming polymer is limited. Thus, the degree of hydrophobicization cannot be set independently, since the amount of redispersion powder used depends on the desired mechanical strengths of the building materials to be modified and thus primarily on the proportion of polymer in the powder.

For pure hydrophobicization, including that of building materials, use is made of redispersible hydrophobicizing agents which are composed of a hydrophobicizing component and a protective colloid which ensures redispersibility. EP 279373 B1 and EP 508155 B1 describe hydrophobicizing agents which comprise organopolysiloxane and protective colloid and are obtained by drying of the siloxane component in the presence of a water-soluble polymer (protective colloid). DE 10323205 A describes a hydrophobic additive comprising protective colloid and fatty acid (derivative), with the fatty acid or the fatty acid derivative being dried in the presence of from 30 to 95% by weight of protective colloid. DE-A 19542443 recommends using a combination of redispersion powder and redispersible organosilicon compound. A disadvantage of the use of hydrophobicizing agents stabilized by means of protective colloid is that a high proportion of protective colloid has to be used in order to make the hydrophobicizing agent redispersible. However, this protective colloid is water-soluble, contributes nothing to the setting of the building materials and tends to wash out on intensive contact with water.

SUMMARY OF THE INVENTION

It was an object of the present invention to develop a hydrophobicizing additive which can be used as a redispersible powder or as an aqueous dispersion, and has at least slight binder properties and a very low protective colloid content. These and other objects have surprisingly been achieved by using water-insoluble polymers which are stabilized with protective colloid, and, which stabilize the hydrophobic components as well as have binder properties in and of themselves.

This object has surprisingly been able to be achieved by using water-insoluble polymers which are stabilized with protective colloid and, firstly, stabilize the hydrophobic components sufficiently well and, secondly, have binder properties for stabilizing the hydrophobic component.

DETAILED DESCRIPTION OF THE PREFERRED EMBODIMENT(S)

The invention provides a hydrophobicizing additive in the form of a water-redispersible powder or of an aqueous dispersion comprising a) one or more water-insoluble, film-forming base polymers based on homopolymers or copolymers of one or more monomers from the group of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides, b) one or more hydrophobic compounds from the group of organosilicon compounds, fatty acids and their fatty acid derivatives and hydrocarbon waxes, and c) one or more protective colloids, wherein the proportion of the component b) based on the total weight of the component a) is more than 30% by weight.

Vinyl esters suitable for the base polymer a) are vinyl esters of carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 9 to 13 carbon atoms, for example VeoVa9$^R$ or VeoVa10$^R$ (trade names of Resolution Performance Products). Particular preference is given to vinyl acetate.

Suitable methacrylic esters or acrylic esters are esters of unbranched or branched alcohols having from 1 to 15 carbon atoms, e.g. methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate and 2-ethylhexyl acrylate.

Examples of olefins and dienes are ethylene, propylene and 1,3-butadiene. Suitable vinylaromatics are styrene and vinyltoluene. A suitable vinyl halide is vinyl chloride.

If desired, from 0.05 to 50% by weight, preferably from 1 to 10% by weight, based on the total weight of the base polymer, of auxiliary monomers can be present in copolymerized form. Examples of auxiliary monomers are ethylenically unsaturated monocarboxylic and dicarboxylic acids, preferably acrylic acid, methacrylic acid, fumaric acid and maleic acid; ethylenically unsaturated carboxamides and nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or salts thereof, preferably vinylsulfonic acid, and 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide (NMMA), allyl N-methylolcarbamate, alkyl ethers such as the isobutoxy ether or ester of N-methylolacrylamide, of N-methylolmethacrylamide and of allyl N-methylolcarbamate. Epoxy-functional comonomers such as glycidyl methacrylate and glycidyl acrylate are also suitable. Further examples are silicon-functional comonomers such as acryloyloxypropyltri(alkoxy)silanes and methacryloyloxypropyltri(alkoxy)silanes, vinyltrialkoxysilanes and vinylmethyldialkoxysilanes, with alkoxy groups which may be present being, for example, methoxy, ethoxy and ethoxypropylene glycol ether radicals. Mention may also be made of monomers bearing hydroxy or CO groups, for example hydroxyalkyl esters of methacrylic acid and acrylic acid, e.g. hydroxyethyl, hydroxypropyl or hydroxybutyl acrylate or methacrylate and also compounds such as diacetoneacrylamide and acetylacetoxyethyl acrylate or methacrylate.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers.

Preference is given to vinyl acetate homopolymers;
copolymers of vinyl acetate with from 1 to 40% by weight of ethylene;
copolymers of vinyl acetate with from 1 to 40% by weight of ethylene and from 1 to 50% by weight of one or more further comonomers from the group consisting of vinyl esters having from 1 to 15 carbon atoms in the carboxylic acid radical, e.g. vinyl propionate, vinyl laurate, vinyl esters of alpha-branched carboxylic acids having from 9 to 13 carbon atoms, e.g. VeoVa9®, VeoVa10®, VeoVa11®;
copolymers of vinyl acetate, from 1 to 40% by weight of ethylene and preferably 1 to 60% by weight of acrylic esters of unbranched or branched alcohols having from 1 to 15 carbon atoms, in particular n-butyl acrylate or 2-ethylhexyl acrylate; and
copolymers comprising from 30 to 75% by weight of vinyl acetate, from 1 to 30% by weight of vinyl laurate or the vinyl ester of an alpha-branched carboxylic acid having from 9 to 13 carbon atoms, and from 1 to 30% by weight of acrylic esters of unbranched or branched alcohols having from 1 to 15 carbon atoms, in particular n-butyl acrylate or 2-ethylhexyl acrylate, and further comprising from 1 to 40% by weight of ethylene;
copolymers comprising vinyl acetate, from 1 to 40% by weight of ethylene and from 1 to 60% by weight of vinyl chloride; where
the polymers may further comprise the above-mentioned auxiliary monomers in the amounts specified and the percentages by weight in each case add up to 100% by weight.

Preference is also given to (meth)acrylic ester polymers such as copolymers of n-butyl acrylate or 2-ethylhexyl acrylate or copolymers of methyl acrylate with n-butyl acrylate and/or 2-ethylhexyl acrylate;
styrene-acrylic ester copolymers, preferably comprising one or more monomers from the group consisting of methyl acrylate, ethyl acrylate, propyl acrylate, n-butyl acrylate, 2-ethylhexyl acrylate;
vinyl acetate-acrylic ester copolymers, preferably comprising one or more monomers from the group consisting of methyl acrylate, ethyl acrylate, propyl acrylate, n-butyl acrylate, 2-ethylhexyl acrylate and, if desired, ethylene;
styrene-1,3-butadiene copolymers;
where the polymers may further comprise the above-mentioned auxiliary monomers in the amounts specified and the percentages by weight in each case add up to 100% by weight.

The choice of monomers or the choice of the proportions by weight of the comonomers is made so that a glass transition temperature Tg of from −50° C. to +50° C., preferably from −30° C. to +40° C., generally results. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers are given in the Polymer Handbook 2nd Edition, J. Wiley & Sons, New York (1975).

The homopolymers and copolymers are prepared by the emulsion polymerization process or by the suspension polymerization process, preferably by the emulsion polymerization process, with the polymerization temperature generally being from 40° C. to 100° C., preferably from 60° C. to 90° C. The copolymerization of gaseous comonomers such as ethylene, 1,3-butadiene or vinyl chloride can also be carried out under superatmospheric pressure, generally in the range from 5 bar to 100 bar.

The initiation of the polymerization is effected by means of the water-soluble or monomer-soluble initiators or redox initiator combinations customary for emulsion polymerization or suspension polymerization. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile. Examples of monomer-soluble initiators are dicetyl peroxydicarbonate, dicyclohexyl peroxydicarbonate, dibenzoyl peroxide. The initiators mentioned are generally used in an amount of from 0.001 to 0.02% by weight, preferably from 0.001 to 0.01% by weight, in each case based on the total weight of the monomers.

As redox initiators, use is made of combinations of the initiators mentioned with reducing agents. Suitable reducing agents are the sulfites and bisulfites of the alkali metals and of ammonium, for example sodium sulfite, the derivatives of sulfoxylic acid, e.g. zinc or alkali metal formaldehydesulfoxylates, for example sodium hydroxymethanesulfinate, and ascorbic acid. The amount of reducing agent is generally from 0.001 to 0.03% by weight, preferably from 0.001 to 0.015% by weight, in each case based on the total weight of the monomers.

To control the molecular weight, regulating substances can be used during the polymerization. If regulators are used, these are usually used in amounts of from 0.01 to 5.0% by weight, based on the monomers to be polymerized, and are introduced either separately or premixed with reaction components. Examples of such substances are n-dodecyl mercaptan, tert-dodecyl mercaptan, mercaptopropionic acid, methyl mercaptopropionate, isopropanol and acetaldehyde.

Suitable protective colloids c) for the polymerization are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl, hydroxypropyl derivatives; proteins such as casein or caseinate, soybean protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthalene formaldehyde sulfonates, styrene-maleic acid and vinyl ether-maleic acid copolymers.

Preference is given to partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 95 mol % and a Höppler viscosity in 4% strength aqueous solution of from 1 to 30 mPas (Höppler method at 20° C., DIN 53015). Preference is also given to partially hydrolyzed, hydrophobically modified polyvinyl alcohols having a degree of hydrolysis of from 80 to 95 mol % and a Höppler viscosity in 4% strength aqueous solution of from 1 to 30 mPas. Examples are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, and olefins such as ethene and decene. The proportion of hydrophobic units is preferably from 0.1 to 10% by weight, based on the total weight of the partially hydrolyzed polyvinyl alcohol. It is also possible to use mixtures of the polyvinyl alcohols mentioned.

The greatest preference is given to polyvinyl alcohols having a degree of hydrolysis of from 85 to 94 mol % and a Höppler viscosity in 4% strength aqueous solution of from 3 to 15 mPas (Höppler method at 20° C., DIN 53015). The protective colloids mentioned can be obtained by means of processes known to those skilled in the art and are generally added in a total amount of from 1 to 20% by weight, based on the total weight of the monomers, in the polymerization.

If the polymerization is carried out in the presence of emulsifiers, they are present in an amount of from 1 to 5% by weight, based on the amount of monomers. Suitable emulsifiers are anionic, cationic and nonionic emulsifiers, for example anionic surfactants such as alkylsulfates having a chain length of from 8 to 18 carbon atoms, alkyl or alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols, or nonionic surfactants such as alkyl polyglycol ethers or alkylaryl polyglycol ethers having from 8 to 40 ethylene oxide units.

After polymerization has been concluded, an after-polymerization can be carried out using known methods to remove residue monomers, in general by means of an after-polymerization initiated by means of a redox catalyst. Volatile residue monomers can also be removed by means of distillation, preferably under reduced pressure, and, if appropriate, with inert entrainer gases such as air, nitrogen or steam being passed through or over the reaction mixture. The aqueous dispersions obtainable in this way have a solids content of from 30 to 75% by weight, preferably from 50 to 60% by weight.

Water-insoluble, film-forming polyaddition and poly-condensation polymers such as polyurethanes, polyesters, polyethers, polyamides, melamine-formaldehyde resins, naphthalene-formaldehyde resins, phenol-formaldehyde resins, if appropriate also in the form of their oligomeric precursors, may also be suitable as protective colloids for the polymerization.

Organosilicon compounds suitable as component b) of the hydrophobicizing additive are silicic esters, preferably of the formula $Si(OR')_4$, silanes such as tetraorganosilanes $SiR_4$ and organoorganoxysilanes $SiR_n(OR')_{4-n}$ where n=1 to 3, polysilanes preferably having the general formula $R_3Si(SiR_2)_nSiR_3$ where n=0 to 500, organosilanols, preferably of the formula $SiR_n(OH)_{4-n}$, disiloxanes, oligosiloxanes and polysiloxanes, preferably comprising units of the general formula $R_cH_dSi(OR')_e(OH)_fO_{(4-c-d-e-f)/2}$ where c=0 to 3, d=0 to 1, e=0 to 3, f=0 to 3 and the sum c+d+e+f for each unit is not more than 3.5, where the radicals R are in each case identical or different and are branched or unbranched alkyl radicals having from 1 to 22 carbon atoms, cycloalkyl radicals having from 3 to 10 carbon atoms, alkylene radicals having from 2 to 4 carbon atoms, or aryl, aralkyl, alkylaryl radicals having from 6 to 18 carbon atoms, and the radicals R' are identical or different alkyl radicals and alkoxyalkylene radicals each having from 1 to 4 carbon atoms, preferably methyl and ethyl, where the radicals R and R' may also be substituted by halogens such as Cl, by ether, thioether, ester, amide, nitrile, hydroxyl, amine, carboxyl, sulfonic acid, carboxylic anhydride and carbonyl groups, and, in the case of the polysilanes, R can also have the meaning OR'. Carbosilanes, polycarbosilanes, carbosiloxanes, polycarbosiloxanes, polysilylenedisiloxanes, and cyclosiloxanes are also suitable.

Preferred organosilicon compounds are tetramethoxysilane, tetraethoxysilane, methyltripropoxysilane, methyltri (ethoxyethoxy)silane, vinyltri(methoxyethoxy)silane, (meth)acryloyloxypropyltrimethoxysilane, (meth)acryloyloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, methylhydrogenpolysiloxanes capped by trimethylsiloxy end groups, copolymers of dimethylsiloxane and methylhydrogensiloxane units capped by trimethylsiloxy end groups, and dimethylpolysiloxanes, dimethylpolysiloxanes having Si—OH groups in the terminal units. Preference is also given to linear and branched oligosiloxanes and polysiloxanes and also silicone resins which can be obtained by a condensation reaction of one or more of the abovementioned low molecular silicon compounds, most preferably those prepared using methylalkoxysilanes, ethylalkoxysilanes, phenylalkoxysilanes, isooctylalkoxysilanes, n-octylalkoxysilanes, hexadecylalkoxysilanes and H-silanes.

The greatest preference is given to the organoorganoxysilanes $SiR_n(OR')_{4-n}$ where n=1 to 3, in particular isooctyltriethoxysilane, n-octyltriethoxysilane, hexadecyltriethoxysilane and the organopolysiloxanes $R_cH_dSi(OR')_e(OH)_fO_{(4-c-d-e-f)/2}$ where c=0 to 3, d=0 to 1, e=0 to 3, f=0 to 3 and the sum c+d+e+f in each unit is not more than 3.5, in particular methylsilicone resins, ethylsilicone resins, phenylsilicone resins and H-silicone resins.

The organosilicon compounds used according to the invention are commercial products or can be prepared by customary methods of silicon chemistry, e.g. processes as described in Noll, Chemie und Technologie der Silikone, 2nd edition 1968, Weinheim, and in Houben-Weyl, Methoden der organischen Chemie, Volume E20, Georg Thieme Verlag, Stuttgart (1987). The silicon compounds mentioned can be present either alone or as a mixture in the hydrophobicizing additive.

Further suitable components b) are fatty acids and fatty acid derivatives which liberate fatty acid or the corresponding fatty acid anion under alkaline conditions, preferably pH>8. Preference is given to fatty acid compounds from the group consisting of fatty acids having from 8 to 22 carbon atoms, their metal soaps, their amides and their esters with monohydric alcohols having from 1 to 14 carbon atoms, with glycol, with polyglycol, with polyalkylene glycol, with glycerol, with monoethanolamine, diethanolamine or triethanolamine, with monosaccharides and with polyhydroxy compounds.

Suitable fatty acids are branched and unbranched, saturated and unsaturated fatty acids each having from 8 to 22 carbon atoms. Examples are lauric acid (n-dodecanoic acid), myristic acid (n-tetradecanoic acid), palmitic acid (n-hexadecanoic acid), stearic acid (n-octadecanoic acid) and oleic acid (9-dodecenoic acid).

Suitable metal soaps are those of the abovementioned fatty acids with metals of the 1st to 3rd main groups or 2nd transition group of the PTE, and also with ammonium compounds $NX_4^+$, where the radicals X are identical or different and are each H, a $C_1$-$C_8$-alkyl radical or a $C_1$-$C_8$-hydroxyalkyl radical. Preference is given to metal soaps with lithium, sodium, potassium, magnesium, calcium, aluminum, zinc, and the ammonium compounds.

Suitable fatty acid amides are the fatty acid amides obtainable from monoethanolamine or diethanolamine and the abovementioned $C_8$-$C_{22}$-fatty acids.

Fatty acid esters suitable as component b) are the $C_1$-$C_{14}$-alkyl esters and -alkylaryl esters of the abovementioned $C_8$-$C_{22}$-fatty acids, preferably methyl, ethyl, propyl, butyl, ethylhexyl esters and also the benzyl esters.

Suitable fatty acid esters also include the monoglycol, diglycol and polyglycol esters of $C_8$-$C_{22}$-fatty acids.

Further suitable fatty acid esters are the monoesters and diesters of polyglycols and/or polyalkylene glycols having up to 20 oxyalkylene units, e.g. polyethylene glycol and polypropylene glycol.

Also suitable are the fatty acid monoesters, diesters and triesters of glycerol with the abovementioned $C_8$-$C_{22}$-fatty acids, and also the fatty acid monoesters, diesters and triesters of monoethanolamine, diethanolamine and triethanolamine with the abovementioned $C_8$-$C_{22}$-fatty acids. Also suitable are the fatty acid esters of sorbitol and mannitol.

Particular preference is given to the $C_1$-$C_{14}$-alkyl esters and -alkylaryl esters of lauric acid and of oleic acid, monoglycol and diglycol esters of lauric acid and of oleic acid, and also the fatty acid monoesters, diesters and triesters of glycerol with lauric acid and oleic acid.

Further suitable hydrophobicizing agents b) are hydrocarbon waxes such as paraffin waxes and polyalkylene waxes.

The hydrophobicizing agents b) mentioned can be used alone or in the form of mixtures. The hydrophobicizing additive component b) is preferably used in amounts of from 35 to 500% by weight based on the amount of component a).

To produce the hydrophobicizing additives, the component b) can be mixed in various ways with the polymer dispersion and, if desired, then subsequently be dried. As described in EP 0741759 B1, the polymerization of ethylenically unsaturated monomers to form the water-insoluble homopolymers or copolymers can be carried out in the presence of the silicon compounds. It is also possible to emulsify the component b) under the action of high shear in the presence of the polymer dispersion, if appropriate with addition of further emulsification aids such as emulsifiers or water-soluble protective colloids. The component b) is preferably added in the form of an emulsion to the polymer dispersion. The hydrophobicizing additives obtainable in this way, in the form of their aqueous dispersions, generally have a solids content of from 40 to 80%.

To emulsify the component b), it is possible to use emulsifiers or protective colloids which can be used in pure form or as mixtures and can be identical to or different from the abovementioned emulsifiers and protective colloids which can be used in the polymerization. Possible emulsifiers include anionic, cationic and also nonionic emulsifiers. Preference is given to emulsifiers which are not soluble in the protective colloid and whose molecular weights are, unlike those of the protective colloids, below 2000. Suitable emulsifiers are well known to those skilled in the art and may be found, for example, in Houben-Weyl, Methoden der organischen Chemie, Vol. XIV, 1, Makromolekulare Stoffe, Georg Thieme Verlag, Stuttgart, 1961, 192-208. The emulsifiers are generally used in amounts of up to 5% by weight, based on the component b).

In a preferred embodiment, an emulsion of the component b) with from 5 to 50% by weight, preferably from 10 to 35% by weight, of protective colloid, based on the total mass of component b), is produced. Suitable protective colloids c) are the same as the protective colloids c) for the polymerization, for example partially hydrolyzed polyvinyl alcohols; polyvinylpyrrolidones; polysaccharides in water-soluble form, e.g. starches (amylose and amylopectin), celluloses and their carboxymethyl, methyl, hydroxyethyl, hydroxypropyl derivatives; proteins such as casein or caseinate, soybean protein, gelatin; lignosulfonates; synthetic polymers such as poly (meth)acrylic acid, copolymers of (meth)acrylates with carboxyl-functional comonomer units, poly(meth)acrylamide; polyvinylsulfonic acids and their water-soluble copolymers; melamine formaldehyde sulfonates, naphthalene formaldehyde sulfonates, styrene-maleic acid and vinyl ether-maleic acid copolymers. In a preferred embodiment, the emulsions of the silicone compounds are stabilized with polyvinyl alcohols having a degree of hydrolysis of from 85 to 94 mol % and a Höppler viscosity in 4% strength aqueous solution of from 3 to 15 mPas (Höppler method at 20° C., DIN 53015).

Furthermore, protective colloids c), which can be used as atomization aids, can be additionally present in the production of water-redispersible powders. In the embodiment in which the component b) is added as a preemulsion of the dispersion of the base powder a) stabilized by means of a protective colloid, preference is given to adding no further protective colloid prior to atomization. The group of suitable protective colloids for atomization is the same as the above-mentioned group of protective colloids c) for polymerization or emulsification of component b). The dispersion powder composition comprises, for example, >3% by weight, preferably from 7 to 30% by weight, of protective colloid, based on the total weight of the hydrophobicizing component b). The protective colloids for emulsification of the component b) and the protective colloids for atomization do not have to be identical or belong to the same chemical group, although this is preferred. In a particularly preferred embodiment of the dispersion powder composition, polyvinyl alcohols, in particular those mentioned above as preferred, are used both for emulsification of the component b) and as atomization aid.

Further constituents of the dispersion powder composition which are present in preferred embodiments are organic and inorganic additives. Possible additives, which are, however, not restricted to the compounds mentioned below, can be: antifoams, inorganic or mineral antiblocking agents or fillers. The additives can each be present in the dispersion powder composition of the invention in amounts of up to 50% by weight, preferably up to 30% by weight, particularly preferably up to 20% by weight, based on the sum of the proportions by weight of water-insoluble, film-forming polymer and component b). Antifoams are usually present in the dispersion powder composition of the invention in an amount of up to 5% by weight.

The hydrophobicizing additive in powder form can contain inorganic or mineral compounds, preferably in a proportion of from 5 to 30% by weight in the dispersion powder composition. These inorganic additives increase the storage stability of the dispersion powder composition by improving the blocking stability, in particular in the case of powders having a low glass transition temperature. Examples of conventional antiblocking agents (anticaking agents) are Ca carbonate or Mg carbonate, talc, gypsum, silica, kaolins, silicates having particle sizes in the range of preferably from 10 nm to 100 µm. The inorganic or mineral additives can also influence the properties of the dispersion powder composition in use, for example the hardness of coatings.

To produce the dispersion powder compositions, the aqueous dispersions and emulsions of the component b) are, if appropriate after addition of protective colloids as atomization aid and further additives, dried separately or as a mixture, for example by means of fluidized bed drying, freeze drying or spray drying. Preference is given to spray drying. Spray drying is carried out in customary spray drying units, with atomization effected by means of single-fluid, two-fluid or multifluid nozzles or a rotary atomizer disk. The dispersions or emulsions to be dried can be atomized as a mixture or be atomized separately and simultaneously or separately in succession. The outlet temperature is generally set in the range from 45° C. to 120° C., preferably from 60° C. to 90° C., depending on the unit, the Tg of the resin and the desired degree of drying.

In spray drying, a content of up to 1.5% by weight of antifoam, based on the base polymer, has frequently been found to be advantageous.

The viscosity of the feed to be atomized is set via the solids content so that a value of <1000 mPas (Brookfield viscosity at 20 revolutions and 23° C.), preferably <350 mPas, is obtained. The solids content of the dispersion to be atomized is >30%, preferably >40%.

To improve the use properties, further additives can be added during atomization. Further constituents of dispersion powder compositions which are present in preferred embodiments are, for example, antifoams, pigments, and foam stabilizers.

The hydrophobicizing additives can be used as an aqueous dispersion or as water-redispersible powders in the typical fields of application. They can be used alone or in combination with conventional polymer dispersions or redispersion powders, for example in building chemical products, if appropriate in combination with hydraulically setting binders such as cements (portland cement, alumina cement, pozzolanic cement, slag cement, magnesia cement, phosphate cement), plaster of Paris and water glass, for the production of building adhesives, in particular tile adhesives and thermal insulation adhesives, renders, skim coat, knifing fillers, flooring screeds, self-leveling compositions, sealing slurries, jointing mortar and paints. Preferred fields of application are renders, knifing fillers and jointing mortars. The hydrophobicizing additives can also be used as hydrophobicizing agents for sand, clay, paper, textile, natural or synthetic fibers. Surfaces can also be modified or coated with the hydrophobicizing additives, for example in coating applications and paint and varnish applications.

EXAMPLES

Experiments were firstly carried out on the emulsification of the hydrophobicizing component b) and the stability of the resulting dispersions.

Example A

Dispersion 1

159 g of a 20% strength by weight polyvinyl alcohol solution (Höppler viscosity: 4 mPas, degree of hydrolysis: 88 mol %) and 172 g of an 11% strength by weight polyvinyl alcohol solution (Höppler viscosity: 13 mPas, degree of hydrolysis: 88 mol %) were placed in a 3 liter stirred vessel. 192 g of a 1:1 mixture of methylsilicone resin and polydimethylsiloxane were mixed in with vigorous stirring over a period of 5 minutes. 1000 g of a 54.9% strength by weight aqueous polymer dispersion of a vinyl acetate-VeoVa10-ethylene copolymer stabilized with polyvinyl alcohol were added to this emulsion. The total mixture was diluted with 350 g of water. The viscosity was 125 mPas.

Example B

Dispersion 2

The procedure of Example A was repeated, but the 1:1 mixture of methylsilicone resin and polydimethylsiloxane was added to a mixture consisting of the polyvinyl alcohol solutions specified in Example A and the polymer dispersion specified in Example A. The viscosity was 115 mPas.
Results of the Emulsification Experiments:
The quality of the mixtures was assessed by means of the particle distribution (laser light scattering, Coulter LS 230, particle size analyzer, from Beckman) and visually after storage.
The mixture from Example A contained no particles larger than 15 µm and was stable over a number of days even at 50° C.
The mixture from Example B contained particles up to 30 µm and had a broader particle size distribution than the mixture from Example A. After three days, slight phase separation was observed.
The mixtures from Examples A and B which were tested were both stable. A narrower particle size distribution was achieved by the method employed in Example A. This procedure was therefore employed in the following experiments.

Example 1

Powder 1

2.79 kg of a 1:1 mixture of methylsilicone resin and polydimethylsiloxane were emulsified with 2.72 kg of a 20% strength by weight polyvinyl alcohol solution (Höppler viscosity: 4 mPas, degree of hydrolysis: 88 mol %) and 1.90 kg of an 11% strength by weight polyvinyl alcohol solution (Höppler viscosity: 13 mPas, degree of hydrolysis: 88 mol %). This mixture was added to 13.00 kg of a 53.6% strength by weight aqueous polymer dispersion of a vinyl acetate-VeoVa10-ethylene copolymer stabilized with polyvinyl alcohol. The total mixture was diluted with about 8.00 kg of water, so that the viscosity is less than 100 mPas.

The aqueous mixture was dried in a spray drier using the countercurrent principle according to the prior art. Atomization of the liquid which had been heated to about 75° C. was effected by means of a pressure nozzle (single-fluid nozzle) at an atomization pressure of 30 bar. The air temperatures were 150° C. at the inlet of the drier and 85° C. at the outlet of the drier. During drying, 10% by weight of antiblocking agent, based on the total weight of the powder, was added to the drying gas. The weight ratio of silicon compound b) to water-insoluble polymer a) was 40:100.

Example 2

Powder 2

The procedure for preparing the mixture and drying corresponded to Example 1.

The amounts used were:
4.82 kg of a 1:1 mixture of methylsilicone resin and polydimethylsiloxane,
3.62 kg of a 20% strength by weight polyvinyl alcohol solution (Höppler viscosity: 4 mPas, degree of hydrolysis: 88 mol %),
2.63 kg of an 11% strength by weight polyvinyl alcohol solution (Höppler viscosity: 13 mPas, degree of hydrolysis: 88 mol %),
9.00 kg of a 53.6% strength by weight aqueous polymer dispersion of a vinyl acetate-VeoVa10-ethylene copolymer stabilized with polyvinyl alcohol,
8.75 kg of water for diluting the mixture so that the viscosity was less than 100 mPas.
10% by weight of antiblocking agent in the powder.

The weight ratio of silicon compound b) to water-insoluble polymer a) was 100:100.

Example 3

Powder 3

The procedure for preparing the mixture and drying corresponded to Example 1.

The amounts used were:
6.43 kg of a 1:1 mixture of methylsilicone resin and polydimethylsiloxane,
4.34 kg of a 20% strength by weight polyvinyl alcohol solution (Höppler viscosity: 4 mPas, degree of hydrolysis: 88 mol %),
3.22 kg of an 11% strength by weight polyvinyl alcohol solution (Höppler viscosity: 13 mPas, degree of hydrolysis: 88 mol %),
6.00 kg of a 53.6% strength by weight aqueous polymer dispersion of a vinyl acetate-VeoVa10-ethylene copolymer stabilized with polyvinyl alcohol,
9.40 kg of water for diluting the mixture so that the viscosity was less than 100 mPas.
10% by weight of antiblocking agent in the powder.

The weight ratio of silicon compound b) to water-insoluble polymer a) was 200:100.

Example 4

Powder 4

The procedure for preparing the mixture and drying corresponded to Example 1.

The amounts used were:
7.50 kg of a 1:1 mixture of methylsilicone resin and polydimethylsiloxane,
4.78 kg of a 20% strength by weight polyvinyl alcohol solution (Höppler viscosity: 4 mPas, degree of hydrolysis: 88 mol %),
3.58 kg of an 11% strength by weight polyvinyl alcohol solution (Höppler viscosity: 13 mPas, degree of hydrolysis: 88 mol %),
3.50 kg of a 53.6% strength by weight aqueous polymer dispersion of a vinyl acetate-VeoVa10-ethylene copolymer stabilized with polyvinyl alcohol,
9.60 kg of water for diluting the mixture so that the viscosity was less than 100 mPas,
10% by weight of antiblocking agent in the powder.

The weight ratio of silicon compound b) to water-insoluble polymer a) was 400:100.

Comparative Example 5

Powder C5

The procedure for preparing the mixture and drying corresponded to Example 1. A methyl ester of a fatty acid was additionally added to the formulation. The amounts used were:
0.66 kg of a 1:1 mixture of methylsilicone resin and polydimethylsiloxane,
0.35 kg of a methyl ester of a fatty acid (Edenor MEC 12/70),
1.44 kg of a 20% strength by weight polyvinyl alcohol solution (Höppler viscosity: 4 mPas, degree of hydrolysis: 88 mol %),
0.93 kg of an 11% strength by weight polyvinyl alcohol solution (Höppler viscosity: 13 mPas, degree of hydrolysis: 88 mol %),
13.00 kg of a 53.6% strength by weight aqueous polymer dispersion of a vinyl acetate-VeoVa10-ethylene copolymer stabilized with polyvinyl alcohol,
8.20 kg of water for diluting the mixture so that the viscosity was less than 100 mPas,
10% by weight of antiblocking agent in the powder.

The weight ratio of silicon compound+fatty acid ester b) to water-insoluble polymer a) was 14.5:100.

Example 6

Powder 6

The procedure for preparing the mixture and drying was analogous to Example 5. The amounts used were:
1.88 kg of a 1:1 mixture of methylsilicone resin and polydimethylsiloxane,
1.13 kg of a methyl ester of a fatty acid (Edenor MEC 12/70),
2.25 kg of a 20% strength by weight polyvinyl alcohol solution (Höppler viscosity: 4 mPas, degree of hydrolysis: 88 mol %),
1.53 kg of an 11% strength by weight polyvinyl alcohol solution (Höppler viscosity: 13 mPas, degree of hydrolysis: 88 mol %),
14.00 kg of a 53.6% strength by weight aqueous polymer dispersion of a vinyl acetate-VeoVa10-ethylene copolymer stabilized with polyvinyl alcohol,
9.30 kg of water for diluting the mixture so that the viscosity was less than 100 mPas,
10% by weight of antiblocking agent in the powder.
The weight ratio of silicon compound+fatty acid ester b) to water-insoluble polymer a) was 40:100.

Example 7

Powder 7

The procedure for preparing the mixture and drying was analogous to Example 5. The amounts used were:
1.50 kg of a 1:1 mixture of methylsilicone resin and polydimethylsiloxane,
1.13 kg of a methyl ester of a fatty acid (Edenor MEC 12/70),
2.03 kg of a 20% strength by weight polyvinyl alcohol solution (Höppler viscosity: 4 mPas, degree of hydrolysis: 88 mol %),
1.36 kg of an 11% strength by weight polyvinyl alcohol solution (Höppler viscosity: 13 mPas, degree of hydrolysis: 88 mol %),
14.00 kg of a 53.6% strength by weight aqueous polymer dispersion of a vinyl acetate-VeoVa10-ethylene copolymer stabilized with polyvinyl alcohol, 5.60 kg of water for diluting the mixture so that the viscosity was less than 100 mPas,
10% by weight of antiblocking agent in the powder.
The weight ratio of silicon compound+fatty acid ester b) to water-insoluble polymer a) was 35:100.

Example 8

Powder 8

The procedure for preparing the mixture and drying was analogous to Example 1. The amounts used were:
6.00 kg of a 1:1 mixture of methylsilicone resin and polydimethylsiloxane,
2.64 kg of a 20% strength by weight polyvinyl alcohol solution (Höppler viscosity: 4 mPas, degree of hydrolysis: 88 mol %),
4.80 kg of an 11% strength by weight polyvinyl alcohol solution (Höppler viscosity: 13 mPas, degree of hydrolysis: 88 mol %),
2.45 kg of a 49.0% strength by weight aqueous polymer dispersion of a vinyl chloride-vinyl laurate-ethylene copolymer stabilized with polyvinyl alcohol,
11.00 kg of water for diluting the mixture so that the viscosity was less than 100 mPas,
10% by weight of antiblocking agent in the powder.
The weight ratio of silicon compound b) to water-insoluble polymer a) was 500:100.

Example 9

Powder 9

The Example Powder 9 differed from Example 8 only in the choice of the silicon compound. A 92:8 mixture of methylsilicone resin and isooctyltriethoxysilane was used in place of the 1:1 mixture of methylsilicone resin and polydimethylsiloxane.
The procedure for preparing the mixture and drying corresponded to Example Powder 1. The amounts used were:
6.00 kg of a 92:8 mixture of methylsilicone resin and isooctyltriethoxysilane,
2.64 kg of a 20% strength by weight polyvinyl alcohol solution (Höppler viscosity: 4 mPas, degree of hydrolysis: 88 mol %),
4.80 kg of an 11% strength by weight polyvinyl alcohol solution (Höppler viscosity: 13 mPas, degree of hydrolysis: 88 mol %),
2.45 kg of a 49.0% strength by weight aqueous polymer dispersion of a vinyl chloride-vinyl laurate-ethylene copolymer stabilized with polyvinyl alcohol,
11.00 kg of water for diluting the mixture so that the viscosity was less than 100 mPas,
10% by weight of antiblocking agent in the powder.
The weight ratio of silicon compound b) to water-insoluble polymer a) was 500:100.

Comparative Example 10

Powder C10

A powder was produced as described in EP 0754737 A2 without water-insoluble, film-forming polymer a).
6.00 kg of a 1:1 mixture of methylsilicone resin and polydimethylsiloxane were emulsified with 3.60 kg of a 20% strength by weight polyvinyl alcohol solution (Höppler viscosity: 4 mPas, degree of hydrolysis: 88 mol %) and 2.73 kg of an 11% strength by weight polyvinyl alcohol solution (Höppler viscosity: 13 mPas, degree of hydrolysis: 88 mol %). The viscosity was adjusted to less than 100 mPas by addition of 9.00 kg of water. Drying was carried out in a manner analogous to Example 1.

Comparative Example 11

Powder C11

A dispersion powder was prepared without hydrophobic component b).
14.00 kg of a 53.6% strength by weight aqueous polymer dispersion of a vinyl acetate-VeoVa10-ethylene copolymer stabilized with polyvinyl alcohol was mixed with 1.88 kg of a 20% strength by weight polyvinyl alcohol solution (Höppler viscosity: 4 mPas, degree of hydrolysis: 88 mol %) and 3.41 kg of an 11% strength by weight polyvinyl alcohol solution (Höppler viscosity: 13 mPas, degree of hydrolysis: 88 mol %). The viscosity was adjusted to less than 100 mPas by addition of 2.00 kg of water. Drying was carried out as in Example 1.
Testing:
The powders obtained were tested for their powder properties and for the effectiveness as hydrophobicizing agents in cement- and gypsum-containing applications.

Testing of Powder Properties:

The moisture content of the powder, the powder flow, the blocking stability and the quality of a 50% strength redispersion in water were assessed by means of the methods described below.

Determination of the Powder Flow PF of the Powders:

150 g of powder were introduced into a metal funnel having an outlet opening having a diameter of 15 mm. The time taken for the total amount of powder to flow out of the funnel was determined by means of a stopwatch. If powder flow stops before the total amount of powder has run out, the funnel is vibrated by gentle tapping.

The Powder Flow of the Powders was Classified as Follows:
Grade 1: very good powder flow: powder is free-flowing, running-out time very short.
Grade 2: good powder flow: powder is free-flowing, running-out time significantly longer that in the case of grade 1.
Grade 3: satisfactory powder flow: the powder runs out very slowly or powder flow ceases. However, vibrating the funnel results in the powder beginning to flow again.
Grade 4: no powder flow: only part of the powder flows from the funnel or powder bridges are formed. Vibrating the funnel does not enable powder flow to be improved.

Determination of the Quality of Redispersion RD of the Powder:

50 g of dispersion powder were redispersed in 50 ml of water. The particle distribution of the resulting redispersion was measured and compared with the particle distribution of the dispersion or emulsion on which the powder was based.

The Quality of Redispersion was Classified as Follows:
Grade 1: very good redispersion
Grade 2: good redispersion
Grade 3: satisfactory redispersion
Grade 4: very poor redispersion Determination of the Blocking Stability of the Powder BS:

To determine the blocking stability, the dispersion powder was introduced into an iron tube having a screw cap and was then loaded by means of a metal punch. While applying the load, the tube was stored at 50° C. in a drying oven for 16 hours. After cooling to room temperature, the powder was removed from the apparatus and the blocking stability was determined qualitatively by crushing the powder. The blocking stability was classified as follows:
Grade 1: very good blocking stability
Grade 2: good blocking stability
Grade 3: satisfactory blocking stability
Grade 4: not blocking-stable The results of the test (taking into account the moisture content of the powder) are summarized in Table 1.

TABLE 1

Powder properties of Powder 1 to Powder 11

| | Powder | | | | | | | | | | |
|---|---|---|---|---|---|---|---|---|---|---|---|
| | 1 | 2 | 3 | 4 | C5 | 6 | 7 | 8 | 9 | C10 | C11 |
| Moisture content (%) | 1.5 | 1.5 | 1.8 | 1.8 | 2.0 | 2.8 | 2.1 | 1.3 | 2.4 | 1.4 | 1.0 |
| PF | 2 | 2 | 3 | 3 | 2 | 3 | 3 | 3 | 3 | 3 | 2 |
| BS | 2 | 2 | 1 | 3 | 1 | 2 | 2 | 2 | 2 | 2 | 1 |
| RD | 1 | 1 | 2 | 3 | 1 | 1 | 1 | 2 | 2 | 3 | 1 |

The results show that free-flowing and blocking-stable dispersion powder compositions having a weight ratio of hydrophobicizing component b) to water-insoluble polymer of significantly above 0.30 can be produced. The powder and the dispersion properties are still satisfactory to good at a weight ratio of hydrophobicizing component b) to water-insoluble polymer a) of 500:100 (Powder 8 and Powder 9).

Testing of the Dispersion Powder Compositions in Cement-Containing Jointing Mortars:

The formulation of the jointing mortar is shown in Table 2.

TABLE 2

Composition of jointing mortar formulation

| | |
|---|---|
| White cement CEMI 42.5 | 250 |
| Hydrophobicizing additive | 10 |
| Silica sand | 460 |
| Calcium carbonate | 280 |
| Total | 1000.0 |

The dry mortar was mixed with 23.6 g of water per 100 g of dry mix.

In the test without addition of hydrophobicizing additive, the dry mortar was mixed with 24.0 g of water per 100 g.

The hydrophobicization, bending tensile strength and compressive strength of a cement-containing jointing mortar modified with the hydrophobicizing additives according to the invention were determined in accordance with EN 12808.

To carry out testing in accordance with EN 12808, the mortar was applied to a concrete slab using a template (diameter: 50 mm, thickness: 10 mm) to produce the test specimens.

Hydrophobicization (Water Absorption):

After storage under standard conditions for one day (WA 1d), 7 days (WA 7d) and 14 days (WA 14d), a drop of water was in each case applied by means of a pipette and the time (minutes) until the drop of water had penetrated completely into the test specimen was determined.

The testing of the water absorption in % was carried out in accordance with EN 12808-5.

TABLE 3

Results for jointing mortar containing 1% by weight of hydrophobicizing additive

| | Powder | | | | | |
|---|---|---|---|---|---|---|
| | 1 | 2 | C10/C11 (1:1) | 8 | 9 | None |
| WA 1 d (min) | 80 | 50 | 60 | 90 | 420 | 5 |
| WA 7 d (min) | 100 | 70 | 75 | 150 | 420 | 5 |
| WA 14 d (min) | 100 | 90 | 90 | 150 | 420 | 5 |
| BTS (N/mm$^2$); 28 d standard cond. | 4.62 | 3.09 | 2.49 | 3.01 | 3.39 | 4.46 |
| BTS (N/mm$^2$); freezing-thawing | 3.11 | 2.82 | 2.32 | 2.58 | 3.09 | 3.91 |
| CS (N/mm$^2$); 28 d standard cond. | 14.19 | 11.52 | 8.22 | 9.88 | 12.82 | 15.55 |
| CS (N/mm$^2$); freezing-thawing | 11.57 | 10.52 | 8.01 | 9.64 | 12.50 | 14.07 |
| WA 30 min (%) | 0.57 | 1.90 | 2.31 | 2.67 | 1.86 | 2.97 |
| WA 240 min (%) | 1.88 | 3.50 | 3.54 | 5.86 | 3.71 | 6.54 |

The test results from Table 3 confirm the usability of the hydrophobicizing additives having a high proportion of silicon compounds as hydrophobicizing agents in cement-containing mixtures, here a jointing mortar. Addition of one percent of polymer powder to the cement-containing dry mix greatly increases the penetration time for the drop of water compared to the blank without addition of polymer and decreases the water absorption of the test specimen.

For comparison with Powder 2 from Example 2, a 1:1 mixture of the powders C10 and C11 from Comparative Examples 10 and 11 was tested. The results in Table 3 confirm that hydrophobicity and binder properties of the hydrophobicizing additives according to the invention are actually better than the combinations of unmodified redispersion powders (C11) and redispersible hydrophobicizing agent (C10) used according to the prior art for hydrophobicization.

Testing of the Dispersion Powder Compositions in Cement-Containing Compositions:

The hydrophobicization of a cement-containing composition shown in Table 4 as a result of the addition of the hydrophobicizing additive was tested.

To produce the test specimens, the mortar was poured into a prism mold (10×40×160 mm). After storage for 6 days under standard conditions, the penetration time (PT) for a drop of water to penetrate into the surface of the test specimen was measured.

In addition, the test specimen, which was stood up at an angle, was sprayed with water for three days and the wetting of the surface and the beading of water (WBW) was assessed visually.

The Assessment Scale is as Follows:
Grade 1: no wetting of the surface with water. Water droplets bead-off completely.
Grade 2: part of the surface is wetted with water. Water beading effect is still partly present.
Grade 3: specimen surface is completely wetted or specimen is completely wetted through. Water beading effect is no longer present.

TABLE 4

| Composition of cement-containing test formulation | |
|---|---|
| Portland cement CEM I 42.5 R | 270 |
| Silica sand | 470 |
| Hydrophobic additive | 20 |
| Calcium carbonate | 240 |
| Total | 1000.0 |

The mortar was mixed with 27.5 g of water per 100 g of dry mix.

TABLE 5

| Results of hydrophobicization of a cement-containing formulation containing 2% of hydrophobicizing additive | | | | | | | | | | | | | |
|---|---|---|---|---|---|---|---|---|---|---|---|---|---|
| Powder | | | | | | | | | | | | | |
| | 1 | 2 | 3 | 4 | C5 | 6 | 7 | 8 | 9 | C10/C11 (4:10) | C10/C11 (1:1) | C10/C11 (2:1) | C11 | None |
| PT 6 d (h) | 3.5 | 7.5 | >9 | >9 | 4.8 | >9 | >9 | >9 | >9 | 2.8 | 5.0 | 8.7 | 0.1 | 0.0 |
| WBW | 2 | 1-2 | 1 | 1 | 2-3 | 1 | 2 | 1 | 1 | 2 | 2 | 1-2 | 3 | 3 |

The results in Table 5 confirm the effectiveness of the hydrophobicizing additives as hydrophobicizing agents in cement-containing formulations. Increased hydro-phobicization, which can be seen from a longer penetration time for the drop of water or a long-lasting water beading effect, can be achieved by means of an increased proportion of silicon compound in the dispersion powder compositions with a constant usage amount of polymer powder in the cement-containing formulation. The hydrophobicization is superior to that obtained using powder mixtures of an unmodified polymer powder with a powder comprising a silicon compound: compare Example Powder 2 with (C10/C11; 1:1). In addition, a beading effect which is not observed when using the combinations of redispersion powder and redispersible hydrophobicizing agent used in the prior art is obtained. Drops of water impinging on inclined surfaces of the test specimens which have been treated with the hydrophobicizing additive bead off over a long period of time without wetting the surface.

Testing of the Hydrophobicizing Additives in CaSO$_4$-Containing Knifing Fillers:

The plaster of Paris knifing filler indicated in Table 6 was mixed with water and poured into a prism mold (10×40×160 mm). After drying for 7 days, the penetration rate (PR) of a drop of water (1 ml) was tested. In addition, the time-dependent water absorption in a water bath after a storage time of 30 minutes (WA 30) and a storage time of 120 min (WA 120) were determined after drying for 7 days.

TABLE 6

| Composition of the plaster of Paris knifing filler | |
|---|---|
| Alabaster plaster | 800 |
| Calcium carbonate | 161 |
| Cellulose | 9 |
| Hydrophobicizing additive | 20 |
| Potassium sulfate | 10 |
| Total | 1000 |

The plaster of Paris knifing filler was mixed with 54 g of water per 100 g of dry mix.

TABLE 7

| Results of hydrophobicization of plaster of Paris knifing filler | | | | | | | | | | |
|---|---|---|---|---|---|---|---|---|---|---|
| Powder | | | | | | | | | | |
| | 1 | 2 | 3 | C5 | 6 | 7 | C10/C11 (4:10) | C10/C11 (1:1) | C10/C11 (2:1) | None |
| PR 7 d (min) | 13 | 14 | 12 | 7.5 | 11 | 10 | 13 | 10 | 11.5 | 4 |

TABLE 7-continued

Results of hydrophobicization of plaster of Paris knifing filler

| | Powder | | | | | | | | | |
|---|---|---|---|---|---|---|---|---|---|---|
| | 1 | 2 | 3 | C5 | 6 | 7 | C10/C11 (4:10) | C10/C11 (1:1) | C10/C11 (2:1) | None |
| WA 30 (%) | 21.6 | 20.6 | 30.5 | 37.3 | 33.3 | 32.2 | 24.3 | 20.4 | 31.0 | 41.2 |
| WA 120 (%) | 23.6 | 22.3 | 33.0 | 39.2 | 34.2 | 35.4 | 26.3 | 25.5 | 32.7 | 41.4 |

The results in Table 7 confirm that the dispersion powder compositions according to the invention can also be used as hydrophobicizing agents in gypsum-containing building applications and in these applications, too, are superior to the combinations from the prior art: compare Example 2 with (C10/C11; 1:1).

The invention claimed is:

1. A hydrophobicizing additive in the form of a water-redispersible powder comprising:
   a) one or more water-insoluble, film-forming base polymers selected from the group consisting of vinyl acetate homopolymers;
      copolymers of vinyl acetate with from 1 to 40% by weight of ethylene;
      copolymers of vinyl acetate with from 1 to 40% by weight of ethylene and from 1 to 50% by weight of one or more further comonomers selected from the group consisting of vinyl esters having from 1 to 15 carbon atoms in the carboxylic acid radical,
      copolymers of vinyl acetate, from 1 to 40% by weight of ethylene and 1 to 60% by weight of acrylic esters of unbranched or branched alcohols having from 1 to 15 carbon atoms,
      copolymers comprising from 30 to 75% by weight of vinyl acetate, from 1 to 30% by weight of vinyl laurate or the vinyl ester of an alpha-branched carboxylic acid having from 9 to 13 carbon atoms, and from 1 to 30% by weight of acrylic esters of unbranched or branched alcohols having from 1 to 15 carbon atoms, and further comprising from 1 to 40% by weight of ethylene;
      copolymers comprising vinyl acetate, from 1 to 40% by weight of ethylene and from 1 to 60% by weight of vinyl chloride,
      (meth)acrylic ester polymers, styrene-acrylic ester copolymers, vinyl acetate-acrylic ester copolymers, and styrene-1,3-butadiene copolymers,
   b) one or more hydrophobic compounds selected from the group consisting of organosilicon compounds, fatty acids, fatty acid derivatives, and hydrocarbon waxes, and
   c) one or more protective colloids,
   wherein component b) is present in an amount of 100% to 500% by weight based on the weight of component a).

2. The hydrophobicizing additive of claim 1, wherein one or more organosilicon compounds selected from the group consisting of silicic esters, silanes, polysilanes, organosilanols, disiloxanes, oligosiloxanes, polysiloxanes, carbosilanes, polycarbosilanes, carbosiloxanes, polycarbosiloxanes, polysilylenedisiloxanes, and cyclosiloxanes are used as component b).

3. The hydrophobicizing additive of claim 1, wherein one or more compounds selected from the group consisting of fatty acids having from 8 to 22 carbon atoms, their metal soaps, their amides and their esters with monohydric alcohols having from 1 to 14 carbon atoms, their esters with glycol, with polyglycol, with polyalkylene glycol, with glycerol, monoethanolamine, diethanolamine, and triethanolamine, their esters with monosaccharides and polyhydroxy compounds, are used as component b).

4. The hydrophobicizing additive of claim 1, wherein one or more polymers selected from the group consisting of:
vinyl chloride/vinyl laurate/ethylene copolymers, and vinyl acetate/vinyl versatate/ethylene copolymers are used as base polymers a).

5. The hydrophobicizing additive of claim 1, wherein partially hydrolyzed or fully hydrolyzed, optionally hydrophobically modified, polyvinyl alcohols having a degree of hydrolysis of from 80 to 100 mol % and a Höppler viscosity in 4% strength aqueous solution of from 1 to 30 mPas (Höppler method at 20° C., DIN 53015) are used as a protective colloid c).

6. A process for producing the hydrophobicizing additives of claim 1, comprising adding the component b) either alone or as a mixture with further additives to an aqueous dispersion of the polymer a) in pure form or in the form of a preemulsion or atomizing it together with the polymer dispersion during drying or adding it to the polymer powder after drying.

7. A building chemical product, optionally in combination with a hydraulically setting binder, containing a hydrophobicizing additive of claim 1.

8. In a building adhesive, tile adhesive, thermal insulation adhesive, render, skim coat, knifing filler, flooring screed, self-leveling composition, sealing slurry, jointing mortar, or paint, wherein a hydrophobicizing agent is employed, the improvement comprising including at least one hydrophobicizing additive of claim 1.

9. In a binder for sand, clay, paper, textile, or natural or synthetic fibers, the improvement comprising including as said binder at least one hydrophobicizing additive of claim 1.

10. The hydrophobicizing additive of claim 1 which is in the form of an aqueous dispersion prepared from the hydrophobicizing additive in the form of a redispersible powder of claim 1.

11. The hydrophobicizing additive of claim 1, produced by spray drying an aqueous dispersion consisting of a), b), and c).

12. The hydrophobicizing additive of claim 1, wherein the one or more hydrophobic compounds b) are selected from the group consisting of organopolysiloxanes and silicone resins.

13. The hydrophobicizing additive of claim 1, wherein the one or more hydrophobic compounds b) are selected from the group consisting of organopolysiloxanes, silicone resins, fatty acids, fatty acid metal soaps, fatty acid amides, and fatty acid esters of $C_{1-14}$ monohydric alcohols.

14. The hydrophobicizing additive of claim 1, wherein the one or more hydrophobic compounds include all of at least one organopolysiloxane, at least one silicone resin, and at least one further hydrophobic compound selected from the group consisting of fatty acids, fatty acid derivatives, and hydrocarbon waxes.

15. The hydrophobicizing additive of claim 1, wherein the fatty acids and fatty acid derivatives are selected from the group consisting of fatty acids, fatty acid metal soaps, fatty acid amides, and fatty acid esters of $C_{1-14}$ monohydric alcohols.

* * * * *